United States Patent
Nowak et al.

[19]

[11] Patent Number: 6,144,478
[45] Date of Patent: Nov. 7, 2000

[54] FLEXIBLE ARM PIEZOELECTRIC LENS MOVER

[75] Inventors: William J. Nowak, Webster; James J. Appel, Rochester; Edward C. Bock, Macedon, all of N.Y.

[73] Assignee: Xerox Corporation, Stamford, Conn.

[21] Appl. No.: 09/210,187

[22] Filed: Dec. 11, 1998

[51] Int. Cl.$^7$ .................................................. G02B 26/08
[52] U.S. Cl. ........................... 359/210; 359/201; 359/813
[58] Field of Search ..................... 359/198, 201, 359/209, 210, 216, 217, 224, 813; 347/259, 260, 261

[56] References Cited

U.S. PATENT DOCUMENTS

| | | | |
|---|---|---|---|
| 5,170,089 | 12/1992 | Fulton | 359/813 |
| 5,208,796 | 5/1993 | Wong et al. | 369/97 |
| 5,287,125 | 2/1994 | Appel et al. | 346/108 |

*Primary Examiner*—Darren Schuberg
*Assistant Examiner*—Euncha Cherry
*Attorney, Agent, or Firm*—John M. Kelly

[57] ABSTRACT

Raster output scanners having piezoelectric-activated lens movers comprised of a mounting base, an electrically operated piezoelectric element connected to the mounting base, a flexible linkage having a lens mount, and a lens attached to the lens mount. The flexible linkage includes flexible arms that can flex in the predominate direction of motion of the piezoelectric element, but that are substantially rigid in another direction. The flexible linkage is mounted such that the flexible arms bias the lens toward the piezoelectric element. Expansion and contraction of the piezoelectric element, combined with the bias of the flexible arms cause the lens mount and its attached lens to follow the expansion and contraction of the piezoelectric element. The rigidity of the flexible arms hold the lens in the proper focal plane. Beneficially, the piezoelectric element is driven so as to compensate for scan line position errors.

18 Claims, 5 Drawing Sheets

FLEXIBLE ARM PIEZOELECTRIC LENS MOVER

FIELD OF THE INVENTION

This invention relates to electrophotographic color printers that use raster output scanners. In particular, it relates to a piezoelectric lens mover that is useful for scan line position control.

BACKGROUND OF THE INVENTION

Electrophotographic marking is a well-known method of copying or printing documents. Electrophotographic marking is performed by exposing a light image representation of a desired final image onto a substantially uniformly charged photoreceptor. In response to that light image the photoreceptor discharges so as to produce an electrostatic latent image of the desired image on the photoreceptor's surface. Toner particles are then deposited onto that latent image to form a toner image. That toner image is then transferred from the photoreceptor onto a substrate such as a sheet of paper. The transferred toner image is then fused to the substrate, usually using heat and/or pressure. The surface of the photoreceptor is then cleaned of residual developing material and recharged in preparation for the production of another image.

The foregoing broadly describes a black and white electrophotographic printing machine. Electrophotographic marking can also produce color images by repeating the above process once for each color of toner that is used to make the composite color image. By placing the various colors of toner in superimposed registration a desired composite color image results.

One way of exposing the photoreceptor is to use a Raster Output Scanner (ROS). A ROS is comprised of a laser light source (or sources) and a rotating polygon having a plurality of mirrored facets. The light source radiates a laser beam onto the polygon facets. That beam reflects from the facets and strikes the photoreceptor, producing a light spot. As the polygon rotates, the spot traces lines, called scan lines, on the photoreceptor. The direction of the sweeping spot is called the fast scan direction. By moving the photoreceptor perpendicular to the fast scan direction, as the polygon rotates the spot raster scans the photoreceptor. The direction of motion of the photoreceptor is referred to either as the slow scan direction or the process direction. During scanning, the laser beam is modulated to produce the desired latent image.

The number of scan lines per inch is an important measure of the quality of the final image. For example, a given printer might produce 600 scan lines per inch in the slow scan direction. Not only is the absolute number of scan lines per inch important, but so is the line spacing evenness. Errors in the slow scan direction as small as 1% of nominal line spacing may be apparent. This implies a need for a high degree of spot position control, especially in printing systems that use multiple laser beams to produce a color print.

Errors in the slow scan direction spot position arise from many sources, including polygon and/or photosensitive member motion flaws, facet and/or image plane (e.g., photosensitive medium) surface defects, etc. These errors are most commonly addressed by the optical systems within the raster output scanner. In particular, U.S. Pat. No. 5,287,125 to Appel et al. discloses a raster output scanner that has process direction (slow scan direction) spot position control that is accomplished using a piezoelectric actuator that moves a pre-polygon lens. An error feedback circuit senses the position of a moving photoreceptor. Position errors produce signals that are applied to the piezoelectric actuator. In response, the piezoelectric actuator expands or contracts, moving the pre-polygon lens, and correcting for the position errors.

While the raster output scanner disclosed in U.S. Pat. No. 5,287,125 is useful, it has its limitations. For example, connecting the pre-polygon lens to the piezoelectric actuator such that the pre-polygon lens accurately tracks the expansion and contraction of the actuator, while simultaneously providing accurate positioning of the pre-polygon lens in the focal plane direction, is difficult and expensive.

Therefore, a piezoelectric activated lens mover in which the moved lens accurately tracks the piezoelectric element and in which that lens remains accurately positioned in the focal plane would be beneficial. Even more beneficial would be a low cost, high displacement piezoelectric activated lens mover in which the moved lens accurately tracks the piezoelectric element and in which that lens remains accurately positioned in the focal plane. Particularly beneficial would be a high displacement piezoelectric activated lens mover.

SUMMARY OF THE INVENTION

The principles of the present invention provide for piezoelectric-activated lens movers, for raster output scanners that use piezoelectric-activated lens movers, and for electrophotographic printing systems that have raster output scanners that use piezoelectric-activated lens movers.

A piezoelectric-activated lens mover according to the present invention includes a mounting frame, a piezoelectric element, beneficially a high displacement disk, connected to the mounting frame, a flexible arm assembly having a lens mount, and a lens attached to the lens mount. The flexible arm assembly includes two flexible arms that can flex in the predominate direction of motion of the piezoelectric element, but that are substantially rigid in another direction. The flexible arm assembly is mounted such that its flex biases the lens toward the piezoelectric element while maintaining the lens in the proper focal position. Expansion and contraction of the piezoelectric element, combined with the bias of the flexible arm assembly enables the lens to track the expansion and contraction of the piezoelectric element without rotating or otherwise perturbing the pre-polygon lens in an undesirable direction.

A raster output scanner according to the principles of the present invention includes a piezoelectric-activated lens mover as described above, wherein the lens attached to the lens holder is a pre-polygon lens. That raster output scanner further includes a laser for producing a laser beam that passes though the pre-polygon lens; a rotating multifaceted polygon for receiving light from the pre-polygon lens and for sweeping that received light in a scan plane; and a voltage source for applying a voltage to the piezoelectric element such that the piezoelectric element moves the pre-polygon lens such that a desired scan plane is achieved.

An electrophotographic marking system according to the principles of the present invention includes a raster output scanner as described above, and a moving photoreceptor. The inventive printing system further includes a photoreceptor position sensor for sensing the position of the photoreceptor, and a controller for controlling the voltage to the piezoelectric element such that the scan line position is moved to compensate for photoreceptor position errors.

BRIEF DESCRIPTION OF THE DRAWINGS

Other aspects of the present invention will become apparent as the following description proceeds and upon reference to.

DETAILED DESCRIPTION OF A PREFERRED EMBODIMENT OF THE INVENTION

Figure 1:
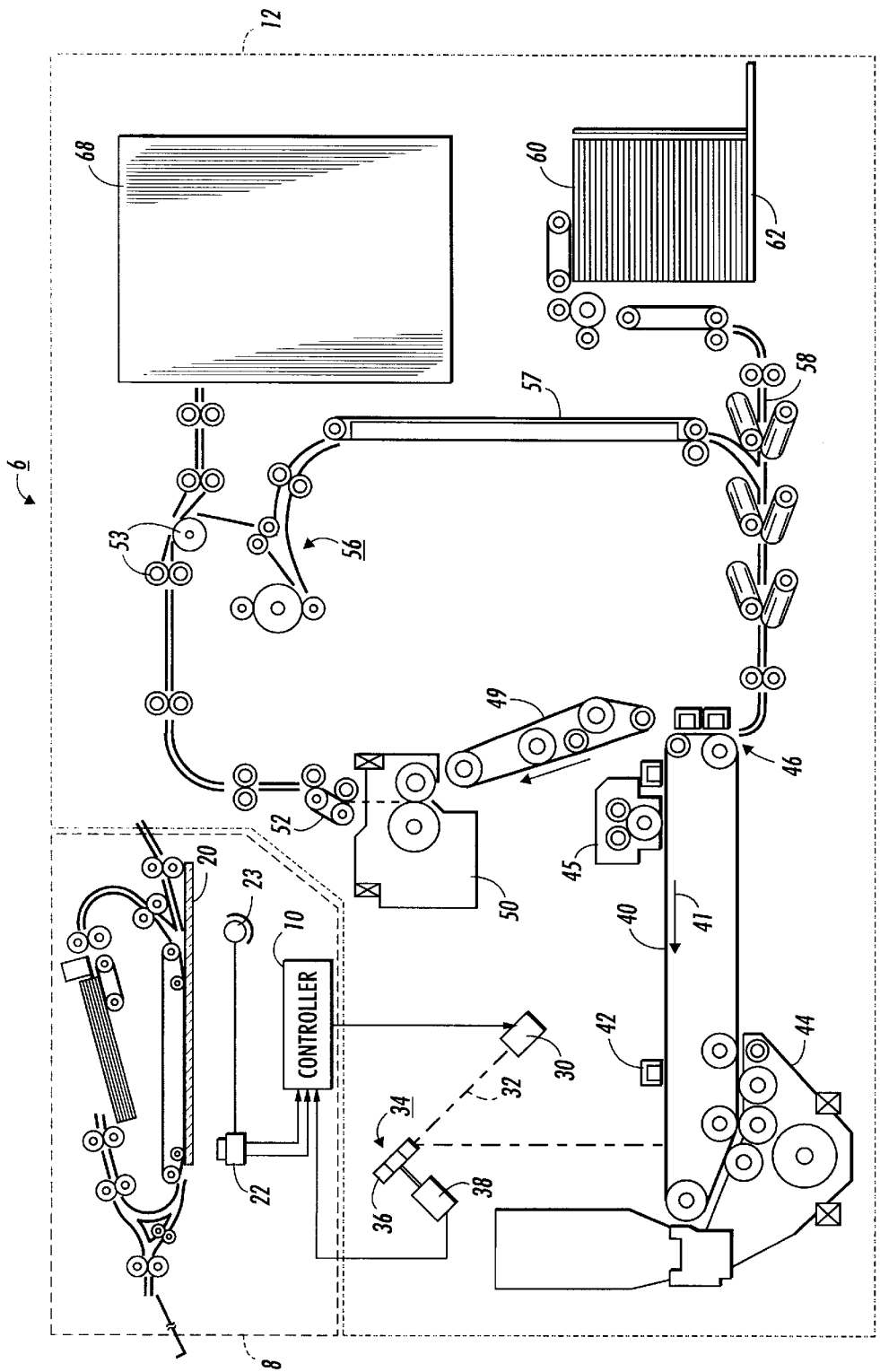
FIG. 1 is a schematic view depicting an illustrative electrophotographic marking machine, specifically a digital copier, that incorporates a piezoelectric-actuated lens mover according to the principles of the present invention.

FIG. 1 shows an exemplary electrophotographic marking machine, specifically a digital copier 6 that is in accord with the principles of the present invention. Generally, the copier includes an input scanner 8, a controller section 10, and an electrophotographic printer 12. The input scanner 8 includes a transparent platen 20 on which a document being scanned is located. One or more photosensitive element arrays 22, which beneficially include charge couple devices (CCD), and a lamp 23 are supported for relative scanning movement below the platen 20. The lamp illuminates the document on the platen, while the photosensitive element array 22 produces image pixel signals from the light reflected by the document. After suitable processing the image pixel signals are converted to digital data signals that are sent to the controller section 10.

The controller section 10, sometimes called an electronic subsystem (ESS), includes control electronics that prepare and manage the flow of digital data to the printer 12. The controller section 10 may include a user interface suitable for enabling an operator to program a particular print job, a memory for storing information, and, specifically important to the present invention, circuitry for synchronizing and controlling the overall operation of the copier 6. In any event, the controller section 10 sends processed digital data signals to the printer 12 as video data.

The printer 12 includes a raster output scanner that produces a latent electrostatic image on a charged photoreceptor 40. The raster output scanner includes a laser diode 30 that produces a laser beam 32 that is modulated in accordance with the video data from the controller section 10. The video data encodes the laser beam with information suitable for producing the desired latent image. From the laser diode the laser beam 32 is directed onto a rotating polygon 34 that has a plurality of mirrored facets 36. A motor 38 rotates the polygon. As the polygon rotates, the laser beam 32 reflects from the facets and sweeps across the photoreceptor 40 while the photoreceptor moves in the direction 41. The sweeping laser beam exposes an output scan line on the photoreceptor 40, thereby creating an output scan line latent electrostatic image. As explained in more detail subsequently, the principles of the present invention are used to control the position of the scan line on the photoreceptor, specifically to compensate for errors in the motion of the photoreceptor.

Before exposure, the photoreceptor is charged by a corotron 42. After exposure, a developer 44 develops the resulting electrostatic latent image. The result is a toner image on the photoreceptor 40. That toner image is transferred at a transfer station 46 onto a substrate 60 that is moved from an input tray 62 to the transfer station by a document handler 58. After transfer, the substrate is advanced by a document transport 49 into a fusing station 50. The fusing station permanently fuses the toner image to the substrate 60. After the toner image is transferred, a cleaning station 45 removes residual toner particles and other debris on the photoreceptor 40.

After fusing, the substrate 60 is passed through a decurler 52. Forwarding rollers 53 then advance the substrate either to an output tray 68 (if simplex printing or after the fusing of a second image in duplex operation) or to a duplex inverter 56 that inverts the substrate. An inverted substrate travels via a transport 57 back into the document handler 58 for registration with a second toner image on the photoreceptor 40. After registration, the second toner image is transferred to the substrate at the transfer station 46. The substrate then passes once again through the fuser 50 and the decurler 52. The forwarding rollers 53 then advance the substrate to the output tray 68.

Figure 2:
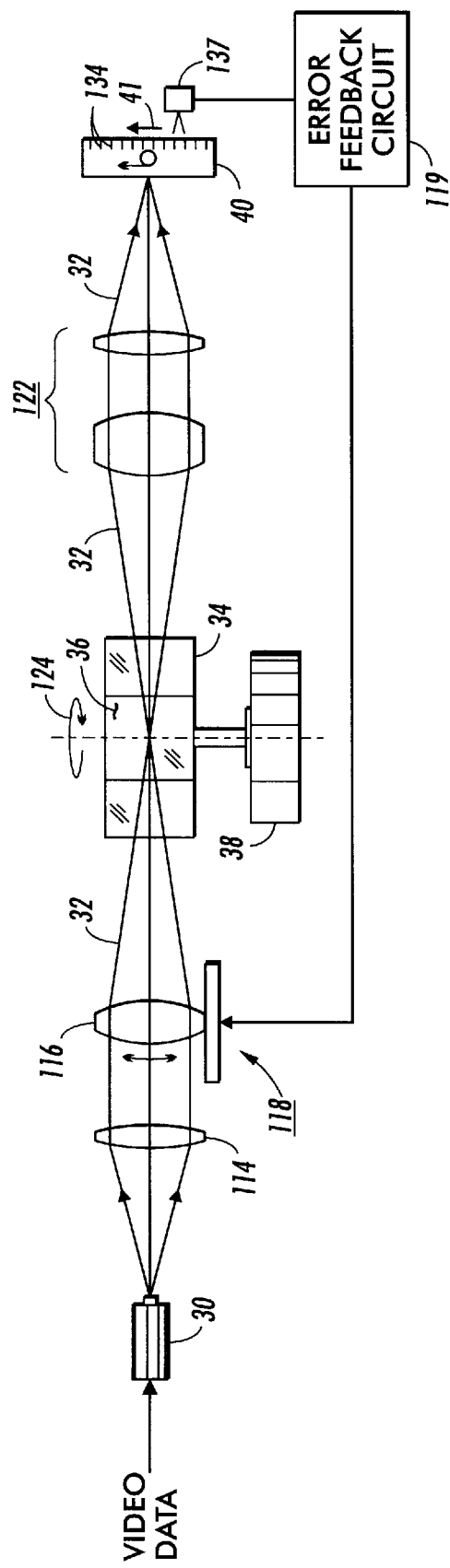
FIG. 2 shows a side view of the optical system, include a Raster Output Scanner (ROS) having a piezoelectric-actuated lens mover, of the electrophotographic marking machine shown in FIG. 1.
Figure 3:
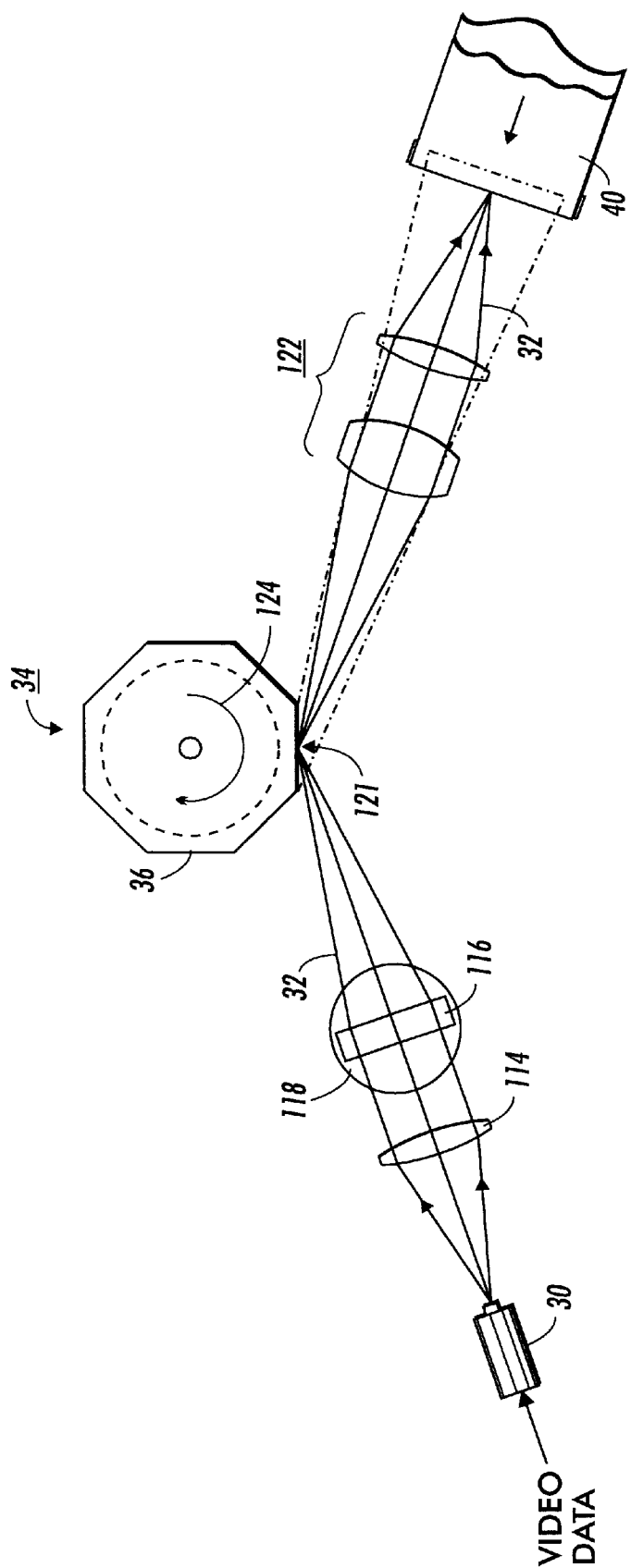
FIG. 3 shows a top view of the optical system of FIG. 2.

The foregoing describes the general operation of the digital copier 6. However, the principles of the present invention most directly relate to the raster output scanner. To better understand the present invention, FIGS. 2 and 3 show the raster output scanner used in the digital copier 6 in more detail The video data from the controller section 10 is applied to the laser diode 30, which produces the modulated laser beam 32. When the laser beam 32 is emitted by the laser diode the beam is diverging. A spherical lens 114 collimates that diverging beam. The collimated beam then enters a cylindrical lens 116, which focuses the beam in the slow scan (process) direction. The cylindrical lens 116 is moved in one plane by a piezoelectric actuator assembly 118. That assembly moves in response to motion error signals from an error feedback circuit 119. The operation of that feedback circuit is described in some detail below.

After passing through the cylindrical lens 116 the focused laser beam is incident at position 121 upon the polygon 34 that is rotated by the motor 38 in a direction 124. The mirrored facets 36 deflect the laser beam as the polygon rotates. As shown most clearly in FIG. 3, the polygon rotation causes the laser beam to deflect across the photoreceptor 40, forming a scan line.

A post-scan optics system 122 both reconfigures the beam into a circular or elliptical cross-section and refocuses that beam to the proper point on the surface of the photoreceptor 40. The post-scan optics also corrects for various problems such as scan non-linearity (f-theta correction) and wobble (scanner motion or facet errors).

Referring now particularly to FIG. 2, the cylinder lens 116 controls the slow scan (process) direction location of the spot, and thus of the scan line, on the photoreceptor 40. In FIG. 2, if the cylinder lens is moved up or down the location of the scan line moves in the slow scan direction an amount that depends on the system's magnification. For example, in one embodiment if the cylinder lens moves 100 microns vertically, the scan line advances (in the direction 41) on the photoreceptor by 60 microns. In operation, position error signals applied to the piezoelectric actuator assembly 118 by the error feedback circuit 119 cause the piezoelectric actuator assembly 118 to move the cylindrical lens 116.

In the digital copier 6, the error feedback circuit 119 controls the piezoelectric actuator assembly such that the cylindrical lens 116 moves to compensate for photoreceptor position errors. To that end the photoreceptor 40 includes a plurality of evenly spaced timing marks 134. A photosensor 137 senses those timing marks and applies digital timing signals to the error feedback circuit 119. Alternatively, timing signals can be generated using a shaft encoder mounted on a photoreceptor roller. In either event, the error feedback circuit 119 electronically determines when and how much the photoreceptor's position varies from ideal. The error feedback circuit 119 then determines and applies the correct position error signal to apply to the piezoelectric actuator assembly such that the cylindrical lens 116 moves the scan line position to compensate for the photoreceptor's position errors.

It should clearly be understood that piezoelectric actuator assemblies could be used for purposes other then for compensating for photoreceptor position errors. For example, piezoelectric actuator assemblies can also be used to maintain the scan line position at a fixed position despite polygon facet defects.

Figure 4:
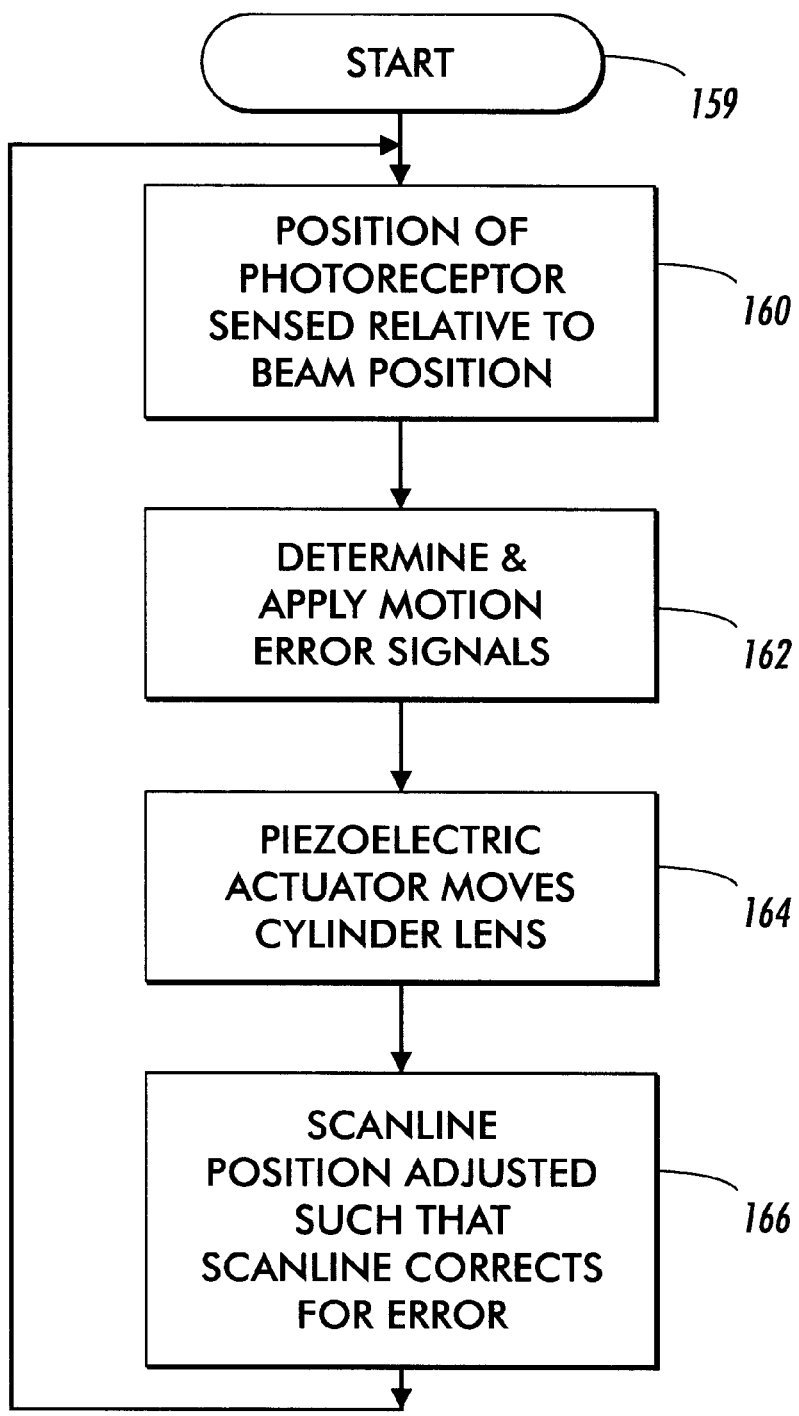
FIG. 4 is a flow diagram of lens position control.

FIG. 4 shows a block diagram of the scan line position control. After start 159, the photosensor 137 senses the timing marks, block 160, and applies digital timing signals to the error feedback circuit 119. The error feedback circuit 119 then determines and applies the correct position error signal to the piezoelectric actuator assembly 118, block 162. That actuator then moves the cylindrical lens 116 to the correct position, block 164. Adjusting the scan line position, block 166.

Figure 5:
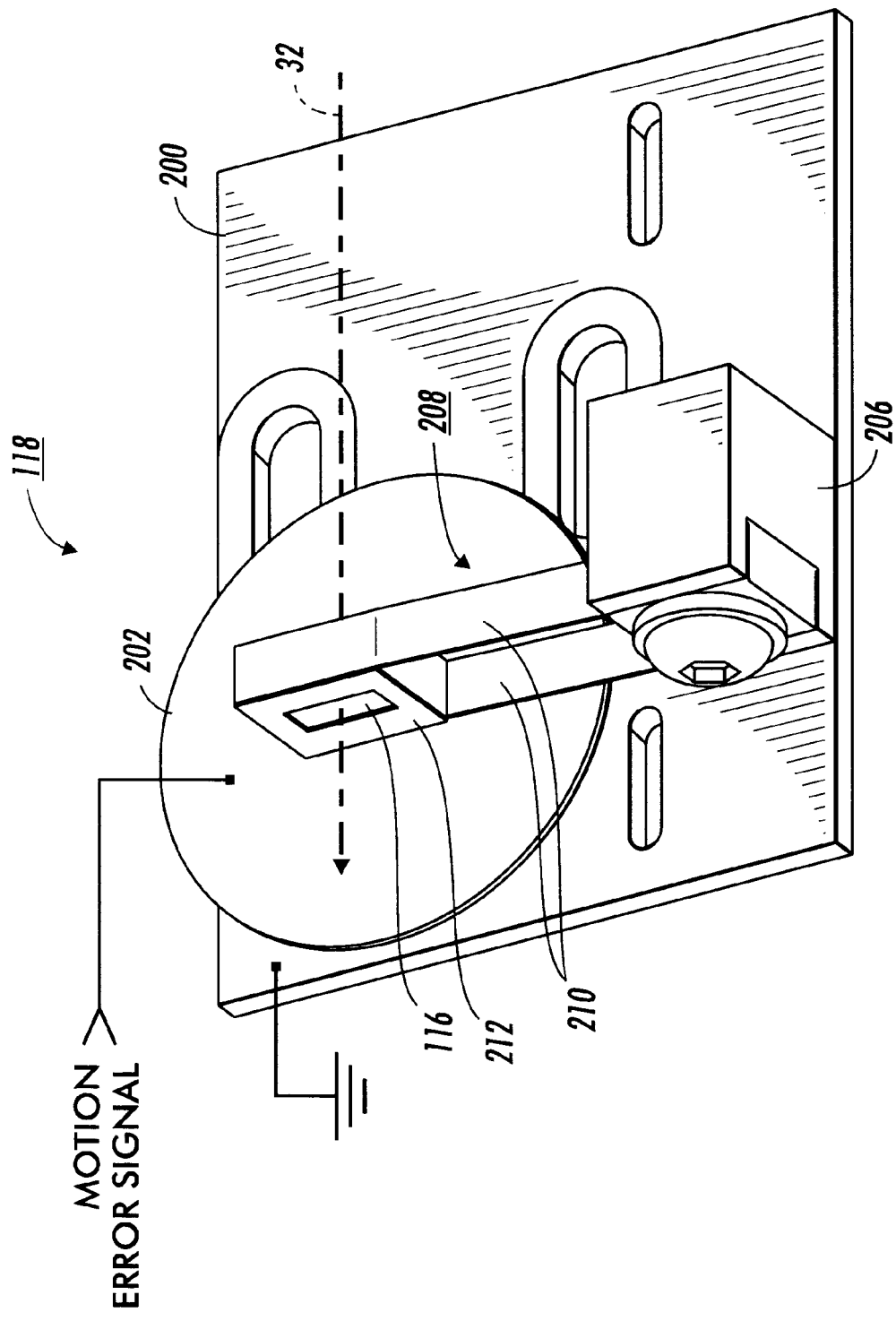
FIG. 5 illustrates a piezoelectric-actuated lens mover according to the principles of the present invention.

FIG. 5 illustrates the inventive piezoelectric actuator assembly used in the copier 6. That assembly includes a mounting frame 200, which is beneficially also used to mount the laser diode 30. However, that is not required and FIG. 5 only shows the laser beam 32. A high displacement piezoelectric disk 202 is mounted on the mounting frame 200 such that the one of the metal-plated surfaces connects to the mounting frame. The mounting frame acts as an electrical ground for the piezoelectric disk (alternatively an electrical connection can be made to the piezoelectric disk using a wire). The other metal-plated surface receives via a wire the position error signal. The position error signal is therefore applied across the piezoelectric disk so as to induce that disk to expand and contract.

One beneficial piezoelectric disk is a high displacement actuator sold as "Rainbow" by Aura Ceramics. Another options is stacking individual piezoelectric disks together.

Also mounted to the mounting frame 200 is an arm mount 206. Attached to that mount is a flexible arm assembly 208. That assembly is comprised of two flexible arms 210 that are flexible in a direction that is normal to the surface of the mounting frame 200, but that are rigid in a direction that is parallel to the surface of the mounting frame. At the end of the flexible arm assembly is a lens holder 212 that holds the pre-polygon cylinder lens 116. The flexible arm assembly mounts to the arm mount 206 such that the flexible arms 210 are biased toward the piezoelectric disk 202. The rigidity of the flexible arms maintains the cylindrical lens at the proper focal position relative to the laser diode 30. Furthermore, the flexibility of the flexible arms enables the piezoelectric element to control the spot position in the slow scan (process) without rotating or otherwise perturbing the cylinder lens in an undesirable direction. Fundamental mechanical properties of dual flexure arms allow this motion while minimizing undesired motion of the cylinder lens, including rotation about and translation along the axis formed by the laser beam path or the axis which defines the cylinder lens curved surface.

It is to be understood that while the figures and the above description illustrate the present invention, they are exemplary only. For example, instead of negatively biasing the photoreceptor, a positively biased photoreceptor might be used. Others who are skilled in the applicable arts will recognize numerous modifications and adaptations of the illustrated embodiments that remain within the principles of the present invention. Therefore, the present invention is to be limited only by the appended claims.

What is claimed:

1. A piezoelectric-actuated lens mover assembly, comprising:

a mounting frame;

a piezoelectric element connected to said mounting frame;

a flexible arm assembly operatively connected to said mounting frame and having flexible arms and a lens mount, wherein said flexible arms flex in a direction of motion of the piezoelectric element, wherein said flexible arms are substantially inflexible in another direction, and wherein said flexible arm assembly is mounted such that said flexible arms bias said lens mount toward said piezoelectric element; and a lens attached to said lens mount.

2. The piezoelectric-actuated lens mover assembly according to claim 1, wherein said piezoelectric element receives an electrical signal that causes said piezoelectric element to expand or contract such that said lens mount moves.

3. The piezoelectric-actuated lens mover assembly according to claim 1, wherein said piezoelectric element is a bi-morph.

4. A raster output scanner, comprising:

a laser source producing a laser beam;

a rotating, multi-faceted polygon; and a piezoelectric-actuated lens mover assembly disposed between said laser source and said rotating, multi-faceted polygon, said piezoelectric-actuated lens mover assembly having a mounting frame, a piezoelectric element connected to said mounting frame, flexible arms, a lens mount, and a lens attached to said lens mount, wherein said flexible arms flex in a direction of motion of the piezoelectric element, wherein said flexible arms are substantially inflexible in another direction, wherein said flexible arms are mounted such that said flexible arms bias said lens mount toward said piezoelectric element, and wherein said lens directs said laser beam toward said multi-faceted polygon.

5. A raster output scanner according to claim 4, wherein said lens is a cylinder lens.

6. A raster output scanner according to claim 4, wherein said flexible arms flex in a direction that is substantially perpendicular to said laser beam.

7. A raster output scanner according to claim 4, wherein said flexible arms are substantially rigid in a direction that is substantially parallel to said laser beam.

8. A raster output scanner according to claim 4, wherein said piezoelectric element receives an electrical signal that causes said piezoelectric element to expand or contract such that said lens moves.

9. A raster output scanner according to claim 8, wherein said lens moves a position of said laser beam on said rotating, multi-faceted polygon.

10. The piezoelectric-actuated lens mover assembly according to claim 4, wherein said piezoelectric element is a bi-morph element.

11. A laser printer, comprising:

a charged photoreceptor moving in a process direction;

a controller producing video data signals; and a raster output scanner receiving said video data signals, said raster output scanner for exposing said photoreceptor such that a latent image representation of said video data signals is produced on said photoreceptor, said raster output scanner having:

a laser source producing a laser beam that is modulated in accordance with said video data signals;

a rotating, multi-faceted polygon for reflecting said laser beam as a scan line on said photoreceptor so as to produce a plurality of output scan lines; and a piezoelectric-actuated lens mover assembly disposed between said laser source and said rotating, multi-faceted polygon, said piezoelectric-actuated lens mover assembly having a mounting frame, a piezoelectric element connected to said mounting frame, flexible arms, a lens mount, and a lens attached to said lens mount, wherein said flexible arms flex in a direction of motion of the piezoelectric element, wherein said flexible arms are substantially inflexible in another direction, wherein said flexible arm assembly arms are mounted such that said flexible arms bias said lens mount toward said piezoelectric element, and wherein said lens directs said laser beam toward said polygon;

wherein a position of said scan line on said photoreceptor depends upon a position of said lens.

12. A laser printer according to claim 11, wherein said piezoelectric element receives an electrical signal that causes said piezoelectric element to expand or contract such that said lens moves.

13. A laser printer according to claim 11, wherein said photoreceptor includes a plurality of timing marks.

14. A laser printer according to claim 12, wherein said laser printer further includes a feedback circuit that monitors photoreceptor position, determines variations in that position, and generates an electrical signal that depends upon said photoreceptor position errors.

15. A laser printer according to claim 14, wherein said electrical signal is applied to said piezoelectric element.

16. A laser printer according to claim 15, wherein said electrical signal causes said piezoelectric element to expand or contract such that said lens moves the position of said scan line on said photoreceptor so as to compensate for said photoreceptor position errors.

17. A laser printer according to claim 11, wherein said lens is a cylinder lens.

18. The piezoelectric-actuated lens mover assembly according to claim 11, wherein said piezoelectric element is a bi-morph element.

* * * * *